(12) United States Patent
Oh

(10) Patent No.: US 6,379,607 B1
(45) Date of Patent: Apr. 30, 2002

(54) METHOD FOR MANUFACTURING CERAMIC BOARDS FOR USE AS FINISHING CONSTRUCTION MATERIALS AND PRODUCTS PRODUCED BY THE METHOD

(75) Inventor: Se Yang Oh, Seoul (KR)

(73) Assignee: Korea Tradart International Co., Ltd., Sungnam (KR)

( * ) Notice: Subject to any disclaimer, the term of this patent is extended or adjusted under 35 U.S.C. 154(b) by 0 days.

(21) Appl. No.: 09/648,674

(22) Filed: Aug. 25, 2000

(30) Foreign Application Priority Data

Aug. 27, 1999 (KR) ............................................. 99-35770

(51) Int. Cl.⁷ ............................................. C04B 33/34
(52) U.S. Cl. ................... 264/602; 264/600; 264/601; 264/679; 264/680; 264/655; 264/660
(58) Field of Search ................... 264/600, 601, 264/602, 680, 679, 655, 660

(56) References Cited

U.S. PATENT DOCUMENTS 3,627,861 A  * 12/1971 Timke ......................... 264/680
3,651,184 A  *  3/1972 Everhart ...................... 264/680
4,078,028 A  *  3/1978 Kishi .......................... 264/602
5,190,708 A  *  3/1993 Vitaliano ...................... 264/601
5,393,471 A  *  2/1995 Rich ........................... 264/219

* cited by examiner

Primary Examiner—James Derrington
(74) Attorney, Agent, or Firm—F. Chau & Associates, LLP

(57) ABSTRACT

A method for manufacturing ceramic boards for use as finishing construction materials is provided, which includes the steps of: blending raw materials at predetermined ratios; mixing the blended raw materials with water to prepare a mixture; kneading the mixture to remove bubbles; molding the bubble-free kneaded mixture into planar wares having a face; engraving a predetermined pattern on the face of the planar wares and then filling the patterns with a colored inlay material to form inlaid surfaces; drying the engraved and inlaid wares; polishing the inlaid surfaces to expose the patterns; primarily calcining the wares having exposed patterns at a temperature of 800° C. to 900° C. for a predetermined period to prepare primary ceramic boards; coating a glaze mixture composed of components at fixed ratios on the faces having the exposed patterns to prepare glazed wares and then drying; and secondary calcining the glazed wares at a temperature of 1250° C. to 1350° C. for a predetermined period.

5 Claims, 2 Drawing Sheets

METHOD FOR MANUFACTURING CERAMIC BOARDS FOR USE AS FINISHING CONSTRUCTION MATERIALS AND PRODUCTS PRODUCED BY THE METHOD

FIELD OF THE INVENTION

The present invention relates to a method for manufacturing ceramic boards for use as finishing construction materials and the products produced by that method and more particularly to a method for manufacturing ceramic boards for use as finishing construction materials which can replace marble or tile used for finishing outer and inner walls of buildings and which are manufactured in the form of boards meeting a prescribed specification by the inlaying process and ceramic or porcelain manufacturing process and also to thus-produced products.

BACKGROUND OF THE INVENTION

Generally, the megalopolises, sometimes called as current dinosaurs, were formed with the appearance of buildings soaring in the sky, as symbolized by those in New York. Those buildings were, however, frequently criticized as "inhumanly environment" or even "Babel Towers of desperation", because they failed to function and serve as a place for culture in the respect of human-friendly space, harmony with surrounding environment and the like.

In repulsion to this, in recent years, particularly in the past nineties, architectural designs for humanly space and environment-friendly buildings have been actively attempted, wherein it is proposed that people of, say, tens of thousands experience the sense of a community through a space provided with gardens and work of art and people entering or leaving the same building have a mutual emotional consensus and so on.

Thus, the constructs including residences began also to have the smack of the conception of space for culture in addition to the traditional functions of space for living an business. A part of such endeavor gave birth to a new conception of building culture, wherein constructs imparted with artistic property and harmonized with the environment provide humanly space. As the result, the construction culture has made a remarkable progress. Accordingly, the industry of interior and exterior decorative materials for finishing building material has also made a progress keeping pace with the progress of construction culture.

The building materials for finishing step as mentioned above maybe broadly classified as interior materials, exterior materials and floor materials. As the materials most commonly used for finishing building materials, timbers, stones including marble, metals and tiles may be mentioned. Particularly, the stones and titles may be mentioned as the most common finishing building materials for interior and exterior decorative materials for buildings.

In the case of stones, however, while they have some characteristic features like gorgeous quality, practical usefulness with natural color and beauty, surface durability, smoothness and the like, such a material can not present a variety of space due to the limited number of colors, resulting in structures of monotonous stone colors. Further, there is a problem of high cost in view of procuring raw materials as most of stones have to depend on import currently.

In the case of tiles industrially produced, on the other hand, while they can be mass-produced at moderate price with excellent smoothness and light weight to enable individualization and ornamentation of interiors through a variety of patterns, they are associated with a problem of breakage risk because of lower strength compared with other types of finishing materials on the ground of qualitative nature and manufacturing process.

As described above, the stones and tiles as finishing building materials could not be called as products giving off the feeling of natural and artistic value, as blocked by the predominant feeling of coldness and uniformity.

SUMMARY OF THE INVENTION

The present invention was created to resolve the above-described problems and the object of the invention is to provide a method for manufacturing ceramic boards for use as finishing construction materials and the products produced by that method wherein ceramic ware in a planar form, that is, plate-formed ceramic ware as finishing building material is manufactured so as to replace finishing building materials such as stones and tiles and the like.

Furthermore, another object of the invention is to provide a finishing material for construction having a high value-added through expression of traditional taste and gracefulness by manufacturing ceramic ware as finishing building material.

Still another object of the invention is to suggest a method of blending raw materials so that deformation including cracking or twisting is not caused during calcination step even in the case of calcining planar wares under intense burning condition.

Another object of the present invention is to suggest a method of drying wares so that deformation including cracking or twisting is not caused during drying ceramic wares molded in a planar form.

The above objects of the invention are achieved according to one aspect of the invention by a method for manufacturing ceramic boards for use as finishing construction materials, wherein the method comprises the steps of: blending raw materials at predetermined ratios; mixing the blended raw materials with water; kneading the mixture for remove bubbles; molding the bubble-free kneaded mixture into planar wares; engraving the molded wares on their respective one faces with predetermined patterns and then filling the engraved patterns with an inlay material of unique color; drying the wares so inlaying-processed; polishing the inlayed surface of the dried wares to expose the inlayed patterns; primarily calcining the wares with exposed inlay patterns at a temperature of 800 to 900° C. for a predetermined period to prepare a primary ceramic board; coating an glaze mixture composed of components at fixed ratios on the surfaces with exposed inlay patterns of the primary ceramic board and drying the so treated wares; and secondarily calcining the primary ceramic boards with the glaze(glaze) at a temperature of 1250 to 1350° C. for a predetermined period to produce the final products of ceramic boards. As shown in the above description, the ceramic wares which have been subjected to the inlay process are dried under compression load at a temperature of 150 to 200° C.

To prevent the deformation of the ceramic boards subjected to calcination, the blended raw materials are so chosen that the chemical assay shows $SiO_2$ at 67.87±1%, $Al_2O_3$ at 17.63±1%, CaO at 3.7±1%, $K_2O$ at 8.07±1%, $Na_2O$ at 1.61±1%, and $Fe_2O_3$ at 1.12±1%, all percents being by weight.

Also, according to another aspect of the invention, to prevent deformation of the ceramic wares during drying operation, it is provided that the wares which have been subjected to the inlay process are placed or sandwiched between neighboring drying plates, in the form of multiple layers, said drying plates being formed with a number of through-holes, and dried under compression load at a temperature of 150° C. to 200° C. for a period of 15 hours or more.

The above objects of the invention may also be achieved according to another specific aspect of the invention by a method for manufacturing ceramic boards for use as finishing construction materials, wherein the method comprises the steps of: blending raw materials at predetermined ratios; mixing the blended raw materials with water; kneading the mixture for remove bubbles; molding the bubble-free kneaded mixture into planar wares; engraving the molded wares on their respective one faces with predetermined patterns and then filling the engraved patterns with an inlay material of unique color; drying and compressing the wares attached with inlay material at a temperature of 150 to 200° C. for a predetermined time; polishing the inlayed surface of the dried wares to expose the inlayed patterns; primarily calcining the wares with exposed inlay patterns at a temperature of 800 to 900° C. for a predetermined period to prepare a primary ceramic board; coating an glaze mixture composed of components at fixed ratios on the surfaces with exposed inlay patterns of the primary ceramic board and drying the so treated wares; and secondarily calcining the primary ceramic boards with the glaze at a temperature of 1250 to 1350° C. for a predetermined period to produce the final products of ceramic boards.

DETAILED DESCRIPTION OF THE INVENTION

In the present invention, which initially takes into consideration the circumstance that the current architectural culture depends on finishing construction materials exclusively composed of marble and inferior tiles, it is important that the ceramic wares, which have been made by the Inlaying technique and Porcelain (with grayish-green glaze) manufacturing process belonging to a Korea's traditional culture, are heremade in the form of plate to apply to finishing construction members.

These ceramic boards according to the invention are the products with the traditional taste and artistic value as can be felt from the ancient inlayed porcelain. Therefore, these ceramic boards are sure to express the same traditional beauty as in those ancient vessel wares, when they are used as finishing materials for interior, exterior and floor of buildings.

The method for manufacturing ceramic boards and the ceramic boards according to a preferred embodiment of the invention will be described in detail below by referring to the accompanying drawings.

Figure 1:
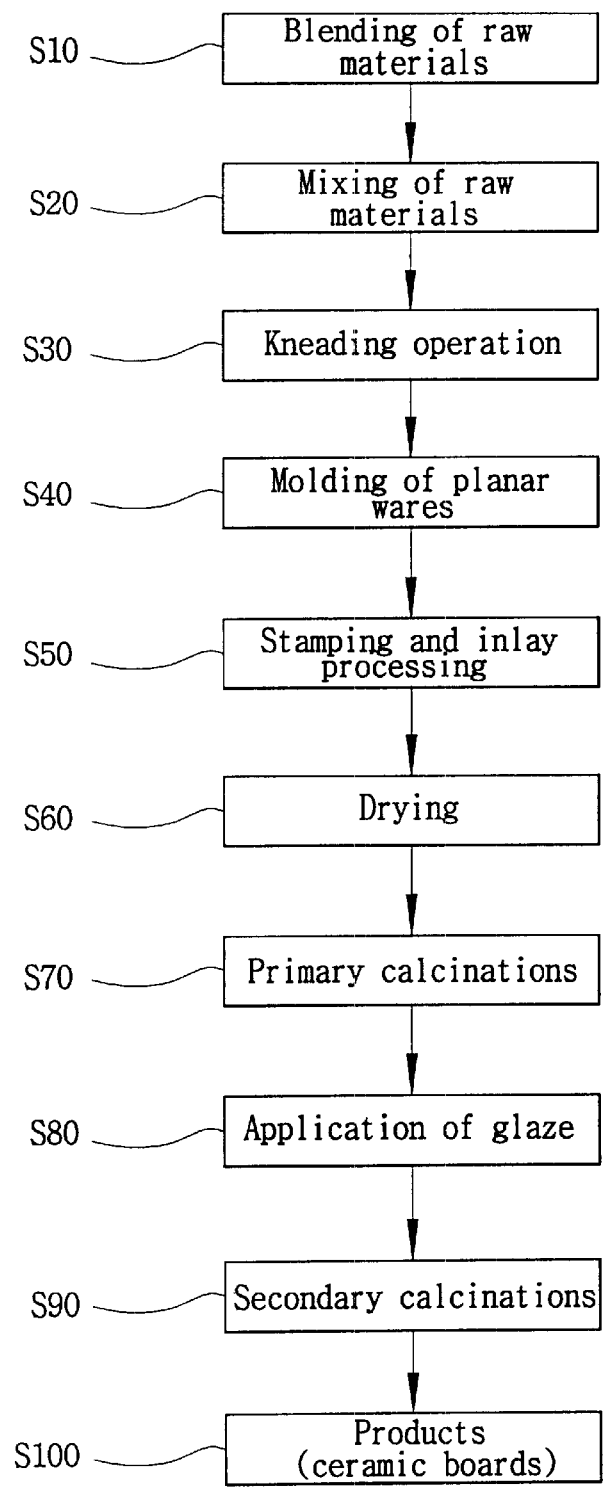
FIG. 1 shows a flow sheet illustrating a method for manufacturing ceramic boards for use as finishing building material according to the invention.
Figure 2:
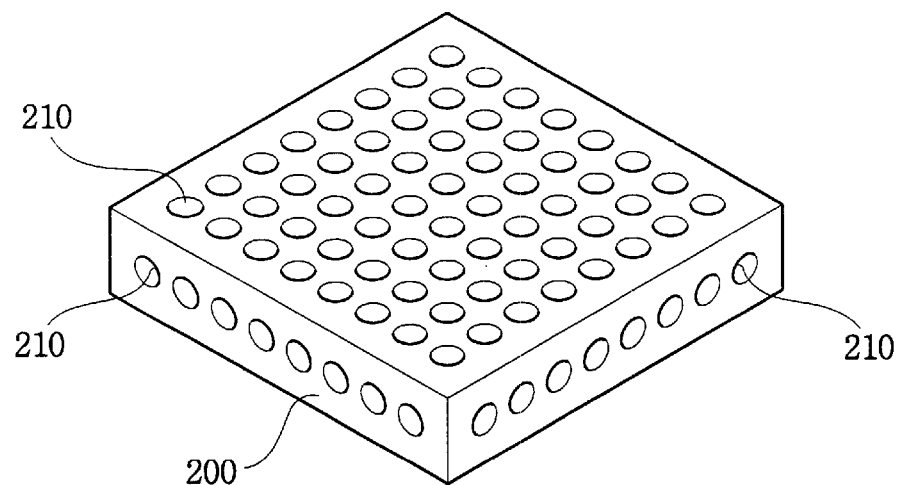
FIG. 2 shows a perspective view of one of drying plates used in drying ceramic boards for use as finishing building material.
Figure 3:
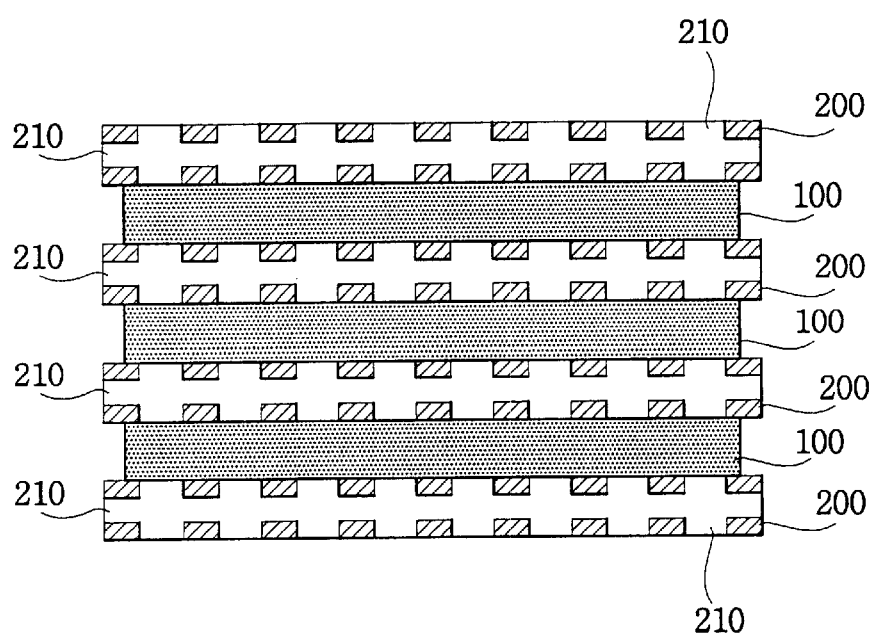
FIG. 3 shows a longitudinal cross section through the drying device in operation for drying ceramic boards for use as finishing building material according to the invention.

FIG. 1 shows a flow sheet illustrating a method for manufacturing ceramic boards as finishing building material according to the invention, FIG. 2 shows a perspective view of one of drying plates used in drying ceramic boards as finishing building material and FIG. 3 shows a longitudinal cross section through the drying device in operation for drying ceramic boards as finishing building material according to the invention.

As shown in Figures, the method of manufacturing ceramic boards for use as finishing building materials according to the invention comprises the steps of; blending raw materials(S 10); mixing the blended raw materials with water (S 20); kneading the mixture to remove bubbles (S 30); molding of the vessel wares 100 into plate form (S 40); engraving the molded wares 100 on one of their faces with predetermined patterns and then filling inlay material of a unique color (S 50); drying the vessel wares 100 so inlay-processed (S 60); polishing the inlayed surface of the dried wares 100 to expose the inlayed patterns (S 70); calcining primarily the wares with inlay patterns exposed at a temperature of 800 to 900° C. for a predetermined time to prepare a primary ceramic wares (S 80); applying an glaze mixture of components at fixed ratios on the burned surface with the exposed inlay patterns and drying the so treated wares 100 (S 90); and calcining secondarily the primary ceramic wares with the glaze at a temperature of 1250 to 1350° C. for a predetermined time to prepare ceramic boards (S 100).

When ceramic boards to be used for finishing building materials are manufactured as described above, ceramic boards without deformation either at the time of drying the vessel wares 100 or at the time of secondary calcining the primary ceramic wares following the primary calcination at a higher firing intensity can be obtained.

The method of manufacturing ceramic boards to be used for finishing building materials is described in further detail in the following.

First, the process for blending raw materials refers to blending chosen components at specific proportions, as described above and the composition so chosen plays a key role in preventing the deformation of the primary ceramic wares at the time of secondary calcination at a higher bubble intensity. The typical composition of the desired blend (based on laboratory test) is $SiO_2$ at 67.87±1%, $Al_2O_3$ at 17.63±1%, CaO at 3.7±1%, $K_2O$ at 8.07±1%, $Na_2O$ at 1.61±1%, and $Fe_2O_3$ at 1.12±1%, all percents being by weight (S 10).

The process step for mixing the blend of raw materials comprises adding a certain amount of water to the blend of raw materials to result in a slip of particulate raw materials (S 20).

In the process for kneading the slip to remove bubbles, which is intended to free the slip from the bubbles formed in the slip, the bubbles are removed by kneading the slip of raw materials for a finite time (S 30). This kneading process to remove bubbles contributes to the production of ceramic panels with smooth and uniform surfaces. In other words, the absence of air bubbles prevents possible expansion in the vessel wares during calcination process to eventually produce the ceramic boards having uniform surfaces.

In the process of forming planar wares 100 from slip, the slip is compressed and molded into the wares 100 in the form of plate in the frame fabricated to a finite specification (S40). The planar wares so molded can vary in the dimension and shape depending on the molding frames.

In the process of inlaying, the molded wares 100 are engraved on one of their faces with predetermined patterns and then inlay material of a unique color is filled in patterned recess and anchored, wherein the inlay material is coated enough so as to cover one full surface of each ware 100. This work is conducted while the wares are still wet and not dried (S 50).

The process of drying the planar wares 100 with inlay materials attached comprises drying wares 100 between neighboring top and bottom drying plates 200 at a temperature between 150 and 200° C. under compressive load (S 60). Under this condition, the wares can be dried without deformation thanks to the drying plates 200.

The process for exposing the inlayed patterns comprises polishing the inlayed surfaces of wares 100 after the inlaying and drying processes to express the inlayed patterns, wherein the wares 100 are polished on the surfaces with inlays to leave only the inlayed patterns by removing the excess inlay material (S 70). As polishing means, sand papers or sponge scrubbers may be used.

In the process of preparing the initial boards through calcination, the wares 100 with inlayed pattern exposed are burned primarily at a temperature of 800 to 900° C. for a predetermined period to produce the initial boards (S 80). Through this primary calcining, the wares 100 turned to the initial boards with finite strength. That is, the initial boards with finite strength are made through the primary baking at a lower bubble intensity.

The process of applying glaze before drying, wherein the glaze mixture of several components at finite ratios is applied on the inlayed surfaces of initial boards and dried, is intended to improve the quality of the primary boards (S 90). As mentioned before, this glaze may be coated only on the surfaces having inlayed patters.

The process for secondary calcination of ceramic boards comprises calcining the primary boards with glaze coated at a temperature of 1250° C. to 1350° C. for a predetermined period to produce the finished boards. Through this secondary calcination, the desired products of ceramic boards for use as finishing building materials according to the invention are produced (S 100).

The completed ceramic boards produced in the method as described above constitute the products rich in cultural attribute which implies natural beauty and taste as may be felted from China-wares to thereby elevate the aesthetics of the appearance of buildings.

In brief, the ceramic boards for finishing building materials according to the invention, to which boards the inlay technology and porcelain manufacturing process are applied, are produced by subjecting the wares molded in plate form according to standards to inlaying process and then calcining the so-processed planar wares twice at different temperatures.

Describing in much more detail, first various inorganic raw materials are blended at appropriate ratios, added with finite amount of water and mixed or stirred. As noted before, these raw materials are blended to give the resulting composition (based on laboratory test), of $SiO_2$ at 67.87 wt %, $Al_2O_3$ at 17.63 wt %, CaO at 3.7 wt %, $K_2O$ at 8.07 wt %, $Na_2O$ at 1.61 wt %, and $Fe_2O_3$ at 1.12 wt %.

The slip or suspension is kneaded continuously for a predetermined time to remove bubbles formed in the slip. As noted before, this kneading is conducted to produce the ceramic boards having uniformly smooth surfaces by eliminating the worry of gas expansion in the wares during baking under a high temperature.

After the bubbles are completely removed, the slip is molded into planar wares 100. The planar wares 100 can be realized variously as required by the specification.

The planar wares 100 molded in accordance with the specification are engraved on respective one surfaces with finite patterns or designs by using an engraving knife, filled on the engraved surfaces with unique-colored inlay substances and secured. Subsequently, the wares filled with the inlay substance are dried. Instead of using an engraving knife, a stamp having a raised carving of finite pattern may be sealed on one side of each ware 100 and then filled on recessed surfaces with inlay substances as in the former case. These steps are covered by the inlaying process.

When drying the wares so inlaying-processed, the wares 100 are placed or sandwiched between neighboring drying plates 200 formed with a number of holes 210 and dried under compression load at a temperature of 150° C. to 200° C. for a period of 15 hours or more. As best seen in FIGS. 2 and 3, rows of through-holes 210 are arranged lengthwise and widthwise on the top or bottom side, and a row of long holes or channels 210 are arranged on the narrow front or rear side as well as on the left or right side, so that substantially all through-holes 210 are communicate with each other in six directions, i.e. vertically, lengthwise and widthwise. During the drying operation, the inlay-processed wares are subjected to vertical compressive load from the laminated wares 100 and drying plates 200 located in the upper zone. The drying plates 200 may be made of wood or PVC.

When the wares 100 are dried in such a manner as described above, the wares 100 are prevented from deformation like cracking or twisting due to the favorable condition of the smooth discharge of moisture, the smooth ventilation or flow of air and the shape maintaining tendency thanks to the drying plates 200.

The wares 100 which have been dried under load are subjected to polishing or grinding to expose the inlayed patterns. As the polishing means, a polishing device specially manufactured may be used in addition to a sandpaper and spongy gourd scrubber.

The wares 100 now transferred to a kiln are burned at a temperature of 800° C. to 900° C. for a predetermined time to produce primary boards. The primary calcining process may last for 7 to 9 hours.

The primary boards 100 which have undergone the primary calcination are coated on the surfaces having trimmed inlay patterns with the glaze composition and dried. The reason why the glaze is applied only on one side with inlay portion is that the glazed surface won't easily attach on underlying wall surface and thus can cause difficulty in the construction job working on inner and outer walls or floors.

The primary ceramic boards coated with glaze are burned at a temperature of 1250° C. to 1350° C. for a predetermined period for the second time to produce the desired products of ceramic boards according to the invention. Preferably, the calcing period for this secondary calcination requires 10 to 12 hours.

On the other hand, the freedom from deformation for the ceramic boards during the secondary calcination is attributable to the specific combination of raw materials, as mentioned before.

The final ceramic boards manufactured as described above can be used for decorating the inner and outer walls, floors, interior utensils and the like of home or business buildings in place of marbles or tiles. The method of performing construction work for the ceramic boards according to the invention is the same as that for stones or tiles.

To sum up, the ceramic boards according to the invention are manufactured through the steps of: blending and kneading the raw materials at their fixed ratios; molding planar wares 100 from the kneaded slip; engraving the wares on their respective one surfaces with finite patterns and filling the engraved surfaces with inlay material of unique color; drying the planar wares with inlay material under compressive load at 150° C. to 200° C. for 15 hours or more; exposing the inlay patterns by polishing the corresponding surfaces; primarily calcining the wares at a temperature of 800° C. to 900° C. for 7 to 9 hours to produce primary ceramic boards; providing the primary ceramic boards on the surfaces having exposed patterns with an glaze and then subjecting the ceramic boards to drying; and secondarily calcining the ceramic boards with glaze at a temperature of 1250° C. to 1350° C. for 10 to 13 hours to produce the desired secondary ceramic boards.

It was clearly found that the ceramic boards following secondary calcination at higher bubble intensity exhibited no deformation due to the specific components and their contents in the raw material blend, as described before.

According to the present invention, a creative cultural product can be realized by manufacturing ceramic boards for use as finishing building materials through the inlay technology and porcelain manufacturing process.

As another advantage of the invention, the method according to the invention allows the ceramic boards as finishing material for construction to be manufactured at the scale of massive production.

As still other advantage, expensive imported marble and low-quality tiles can be replaced by the product of the invention through its application to the finishing work for building or construction. Thus, the constructing cost can be lowed.

On the other hand, an upgraded architectural culture which permits the beauty of porcelain to expressed in the buildings can be achieved by applying the inlay technology of pottery based on the traditional art according to the present invention.

It is to be understood that, while the invention was described with respect to specific embodiments, the invention is never restricted to those embodiments and a variety of modifications and alterations would be possible to a man skilled in the art by referring to the description or drawings presented here and within the spirit of the invention and thus those modifications or alterations are to fall within the scope of the invention, which scope should be limited only by the attached claims.

What is claimed is:

1. A method for manufacturing ceramic boards for use as finishing construction materials, wherein the method comprises the steps of:

blending raw materials at predetermined ratios;

mixing the blended raw materials with water to prepare a mixture;

kneading the mixture to remove bubbles;

molding the bubble-free kneaded mixture into planar wares having a face;

engraving a predetermined pattern on the face of the planar wares and then filling the patterns with a colored inlay material to form inlaid surfaces;

drying the engraved and inlaid wares;

polishing the inlaid surfaces to expose the patterns;

primarily calcining the wares having exposed patterns at a temperature of 800° C. to 900° C. for a predetermined period to prepare primary ceramic boards;

coating a glaze mixture composed of components at fixed ratios on the faces having the exposed patterns to prepare glazed wares and then drying; and secondary calcining the glazed wares at a temperature of 1250° C. to 1350° C. for a predetermined period.

2. The method according to claim 1, wherein the raw materials comprise 67.87±1 wt % of $SiO_2$, 17.63±1 wt % of $Al_2O_3$, 3.7±1 wt % of CaO, 8.07±1 wt % of $K_2O$, 1.61±1 wt % of $Na_2O$, and 1.12±1 wt % of $Fe_2O_3$.

3. The method according to claim 1, wherein the engraved and inlaid wares are placed between neighboring drying plates having a plurality of through-holes, and the engraved and inlaid wares are dried under compression load at a temperature of 150° C. to 200° C. for 15 hours or more.

4. A method for manufacturing ceramic boards for use as finishing construction materials, wherein the method comprises the steps of:

blending raw materials at predetermined ratios;

mixing the blended raw materials with water to prepare a mixture;

kneading the mixture to remove bubbles;

molding the bubble-free kneaded mixture into planar wares having a face;

engraving a predetermined pattern on the face of the planar wares and then filling the patterns with a colored inlay material to form inlaid surfaces;

drying and compressing the engraved and inlaid wares at a temperature of 150° C. to 200° C. for a predetermined period;

polishing the inlaid surfaces to expose the patterns;

primarily calcining the wares having exposed patterns at a temperature of 800° C. to 900° C. for a predetermined period to prepare primary ceramic boards;

coating a glaze mixture composed of components at fixed ratios on the faces having the exposed patterns to prepare glazed wares and then drying; and secondary calcining the glazed wares at a temperature of 1250° C. to 1350° C. for a predetermined period.

5. The method according to claim 1, wherein the step of drying the engraved and inlaid wares is performed for 15 hours or more.

* * * * *